(12) United States Patent
Critelli et al.

(10) Patent No.: US 7,490,414 B2
(45) Date of Patent: **\*Feb. 17, 2009**

(54) TAPE MEASURE WITH EXTENDED STANDOUT

(75) Inventors: James M. Critelli, Fuquay-Varina, NC (US); William C. Blackman, Raleigh, NC (US); Edgar T. Gilliam, Franklinton, NC (US); Darin H. Duphorne, Houston, TX (US); John R. Owen, Cary, NC (US)

(73) Assignee: Cooper Brands, Inc., Houston, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 11/866,761

(22) Filed: Oct. 3, 2007

(65) Prior Publication Data

US 2008/0034605 A1    Feb. 14, 2008

Related U.S. Application Data

(63) Continuation of application No. 11/519,743, filed on Sep. 12, 2006, now abandoned, which is a continuation of application No. 11/013,858, filed on Dec. 16, 2004, now Pat. No. 7,159,331.

(60) Provisional application No. 60/533,093, filed on Dec. 30, 2003.

(51) Int. Cl.
*G01B 3/02* (2006.01)
*G01B 3/10* (2006.01)

(52) U.S. Cl. .............................. 33/755; 33/757; 33/770; 33/771

(58) Field of Classification Search .................... 33/755, 33/757, 758, 759, 768, 770, 771
See application file for complete search history.

(56) References Cited

U.S. PATENT DOCUMENTS

| | | | |
|---|---|---|---|
| 2,050,941 | A | 8/1936 | Farrand |
| 2,319,724 | A | 5/1943 | Dinhofer |
| 2,994,958 | A | 8/1961 | Beeber |
| 3,630,104 | A | 12/1971 | Milner |
| 4,275,503 | A | 6/1981 | Bergkvist |
| 4,352,244 | A | 10/1982 | Tomuro |

(Continued)

FOREIGN PATENT DOCUMENTS

WO    01/35048    5/2001

*Primary Examiner*—G. Bradley Bennett
*Assistant Examiner*—Amy Cohen Johnson
(74) *Attorney, Agent, or Firm*—Coats & Bennett, P.L.L.C.

(57) ABSTRACT

A tape measure comprises a main case having first and second sidewalls and a peripheral wall extending between the sidewalls; a flexible tape blade selectively deployable from the case; the tape blade having a generally curved cross-sectional profile when deployed from the main case and having a generally flat profile when retracted into the main case; a hook attached to a first end of the tape blade so as to be movable a distance along a longitudinal axis of the tape blade; the hook having a first section disposed generally parallel to the longitudinal axis and a second section connected thereto and disposed generally normal to the longitudinal axis, the hook comprising titanium and having a weight factor of not more than about 0.60. The tape blade may advantageously be not more than about 1.10 inch in width and have a standout of at least 9½ feet.

10 Claims, 7 Drawing Sheets

U.S. PATENT DOCUMENTS

| | | | |
|---|---|---|---|
| 4,411,072 A | 10/1983 | Rutty et al. | |
| 4,429,462 A | 2/1984 | Rutty et al. | |
| 4,527,334 A | 7/1985 | Jones et al. | |
| 4,976,048 A | 12/1990 | Blackman | |
| 5,010,657 A | 4/1991 | Knapp | |
| 5,063,686 A | 11/1991 | Peloquin | |
| 5,359,911 A * | 11/1994 | Kruesi | 81/436 |
| 5,659,970 A | 8/1997 | Reedy | |
| 5,879,243 A | 3/1999 | Hackman | |
| 6,243,964 B1 | 6/2001 | Murray | |
| 6,249,986 B1 | 6/2001 | Murray | |
| 6,282,808 B1 | 9/2001 | Murray | |
| 6,324,769 B1 | 12/2001 | Murray | |
| 6,349,482 B1 | 2/2002 | Gilliam | |
| 6,367,161 B1 | 4/2002 | Murray et al. | |
| 6,449,866 B1 | 9/2002 | Murray | |
| 6,473,986 B1 | 11/2002 | Sun | |
| 6,499,226 B1 | 12/2002 | Reda et al. | |
| 6,536,308 B1 | 3/2003 | Thorne et al. | |
| 6,643,947 B2 | 11/2003 | Murray | |
| 6,662,463 B2 | 12/2003 | Lee | |
| 6,678,967 B1 | 1/2004 | Jueneman | |
| 6,718,649 B1 | 4/2004 | Critelli et al. | |
| 6,729,037 B2 | 5/2004 | White | |
| 6,804,899 B2 | 10/2004 | Murray | |
| 6,892,468 B2 | 5/2005 | Murray | |
| 6,907,676 B2 | 6/2005 | Liao | |
| 6,959,500 B2 | 11/2005 | Liao | |
| 7,007,400 B2 | 3/2006 | Liao | |
| 7,062,862 B2 | 6/2006 | Wheaton | |
| 7,096,596 B2 | 8/2006 | Hernandez, Jr. et al. | |
| 7,107,698 B2 | 9/2006 | Liao | |
| 7,159,331 B2 * | 1/2007 | Critelli et al. | 33/755 |
| 2002/0129509 A1 | 9/2002 | Evans | |
| 2003/0233762 A1 | 12/2003 | Blackman | |
| 2004/0071869 A1 | 4/2004 | Gilliam | |

\* cited by examiner

TAPE MEASURE WITH EXTENDED STANDOUT

This is a continuation of U.S. patent application Ser. No. 11/519,743, filed 12 Sep. 2006, which is a continuation of U.S. patent application Ser. No. 11/013,858, filed 16 Dec. 2004, which claims the benefit of U.S. Provisional Application No. 60/533,093, filed 30 Dec. 2003. The disclosures of all the aforementioned applications are incorporated herein by reference.

BACKGROUND OF THE INVENTION

The present invention is directed generally to tape measures, and more particularly to power return tape measures.

Modern tape measures (or "tape rules") typically include a coiled tape that is spring-biased towards a retracted position. A housing generally surrounds and protects the tape and a retraction spring and includes an opening through which a distal end of the tape extends. Typically, the tape measure housing consists of two housing halves that are joined together by one or more screws. In addition, one of the housing halves typically includes an inwardly pointing integral post that provides an anchoring point for one end of the retraction spring. During assembly, the reel is placed over the post with the retraction spring engaged by the post, and the other housing half is then joined to the first housing half with blade winding reel captured therebetween. During use, the distal end of the tape blade is pulled away from the housing; when released, the spring pulls the tape blade back into the housing so that the tape returns to the retracted position. The retracted tape blade is typically wound on the reel that is in turn rotatably supported by the housing.

One aspect of tape measures that is considered by consumers is "blade standout," which is the distance that the measuring blade may be extended out from the housing before it buckles (folds over). The general perception in the marketplace is that longer standout is more desirable, as it allows for the tape blade to span longer distances, such as between rafters of a house under construction.

While a number of approaches have been taken to increase standout, none have proven entirely satisfactory. As such, there remains a need for improved tape measure designs, particularly those that provide a greater standout than standard designs.

SUMMARY OF THE INVENTION

The present invention is directed to a tape measure. In one embodiment, the tape measure comprises a main case having first and second sidewalls and a peripheral wall extending between the sidewalls; a flexible tape blade selectively deployable from the case; the tape blade having a generally curved cross-sectional profile when deployed from the main case and having a generally flat profile when retracted into the main case; a hook attached to a first end of the tape blade so as to be movable a distance along a longitudinal axis of the tape blade; the hook having a first section disposed generally parallel to the longitudinal axis and a second section connected thereto and disposed generally normal to the longitudinal axis; the hook comprising titanium and having a weight factor of not more than about 0.60. The hook may consist essentially of titanium. The tape blade may advantageously be not more than about 1.10 inch in width and have a standout of at least 9½ feet, such as a standout of between 9½ feet and about 10½ feet. The blade may advantageously be subject to a retraction bias. The blade may comprise a distal end portion, an inner end portion, and an expected buckling region therebetween; the distal end portion being deployed before the expected buckling region and the inner end portion when the blade is deployed from the main case; and the assembly may further comprise a reinforcement attached to the blade in the expected buckling region, the distal end portion and the inner end portion being free of the reinforcement, with the expected buckling region including a location where the blade would normally buckle in a standout test absent the reinforcement.

In another embodiment, the tape measure comprises a main case having first and second sidewalls and a peripheral wall extending between the sidewalls; a flexible tape blade selectively deployable from the case; the tape blade having a generally curved cross-sectional profile when deployed from the main case and having a generally flat profile when retracted into the main case; the blade comprising a distal end portion, an inner end portion, and an expected buckling region therebetween; the distal end portion being deployed before the expected buckling region and the inner end portion when the blade is deployed from the case; a hook attached to the distal end portion of the tape blade so as to be movable a distance along a longitudinal axis of the tape blade; the hook comprising a first section disposed generally parallel to the longitudinal axis and a second section connected thereto and disposed generally normal to the longitudinal axis; a reinforcement distinct from but attached to the blade in the expected buckling region, the distal end portion and the inner end portion being free of the reinforcement; the expected buckling region including a location where the blade would normally buckle in a standout test absent the reinforcement. The reinforcement may comprise a metallic plate. The reinforcement may comprise a longitudinally disposed fiber reinforcement, advantageously with the fiber reinforcement comprising a material selected from the group consisting of carbon and aramid. The reinforcement may advantageously be attached to the blade in the expected buckling region by adhesive and/or the reinforcement may be attached to the blade on an upper side thereof. The expected buckling region may be located between about nine and ten-and-one-half feet from the hook. The hook may advantageously have a weight factor not more than about 0.60.

DETAILED DESCRIPTION OF THE INVENTION

Figure 1:
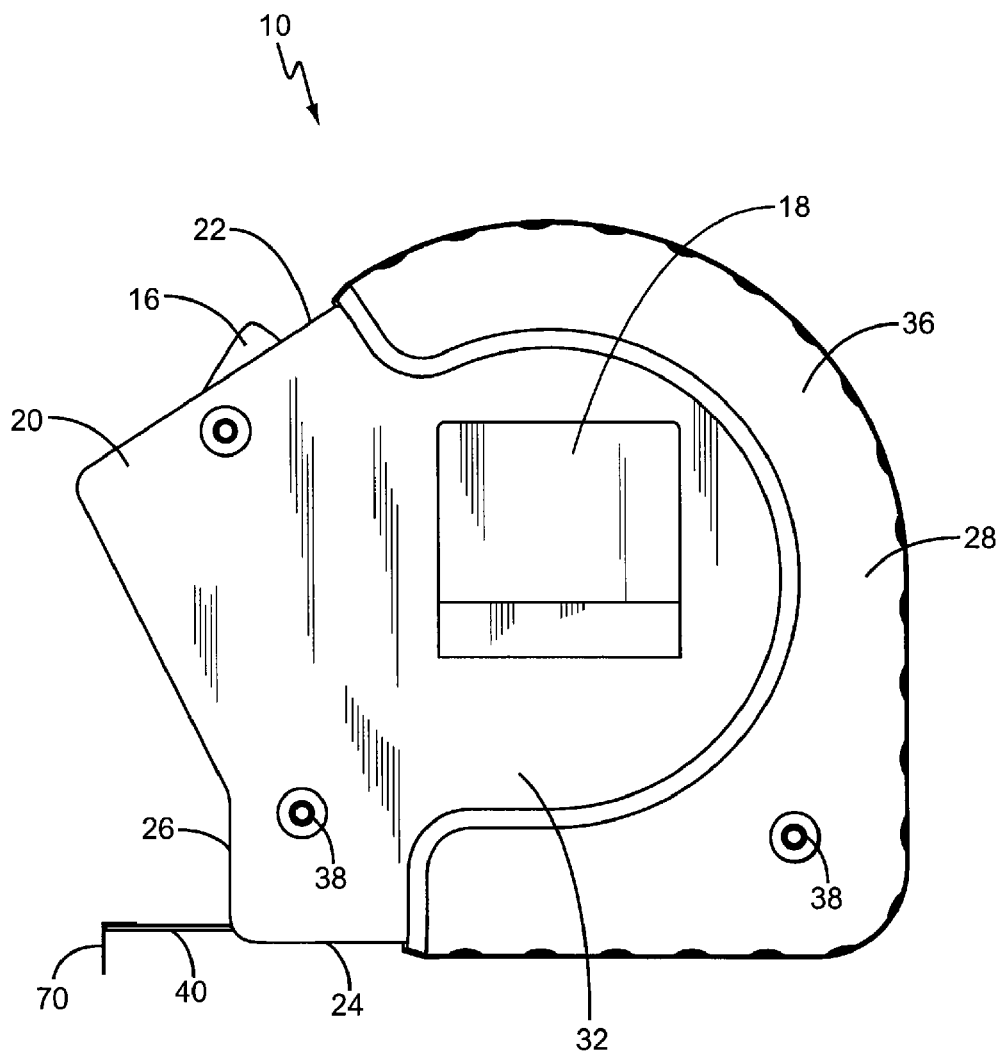
FIG. 1 is a side view of one tape measure embodiment constructed in accordance with the present invention.

As illustrated in FIG. 1, a tape measure, generally designated 10, is shown constructed according to the present invention. The tape measure 10 includes a coilable measuring tape blade 40 and an associated housing 20. An end hook 70 is attached to the distal end of the tape 40. A tape-biasing device, such as a retraction spring (not shown), is operatively connected to the tape 40 to bias it towards a retracted orientation. A locking mechanism, including a toggle 16 or similar actuator is provided to aid in controlling the movement of the tape 40 into and out of the housing 20. One or both sides of the housing 20 may include a clip 18, as desired.

Figure 2:
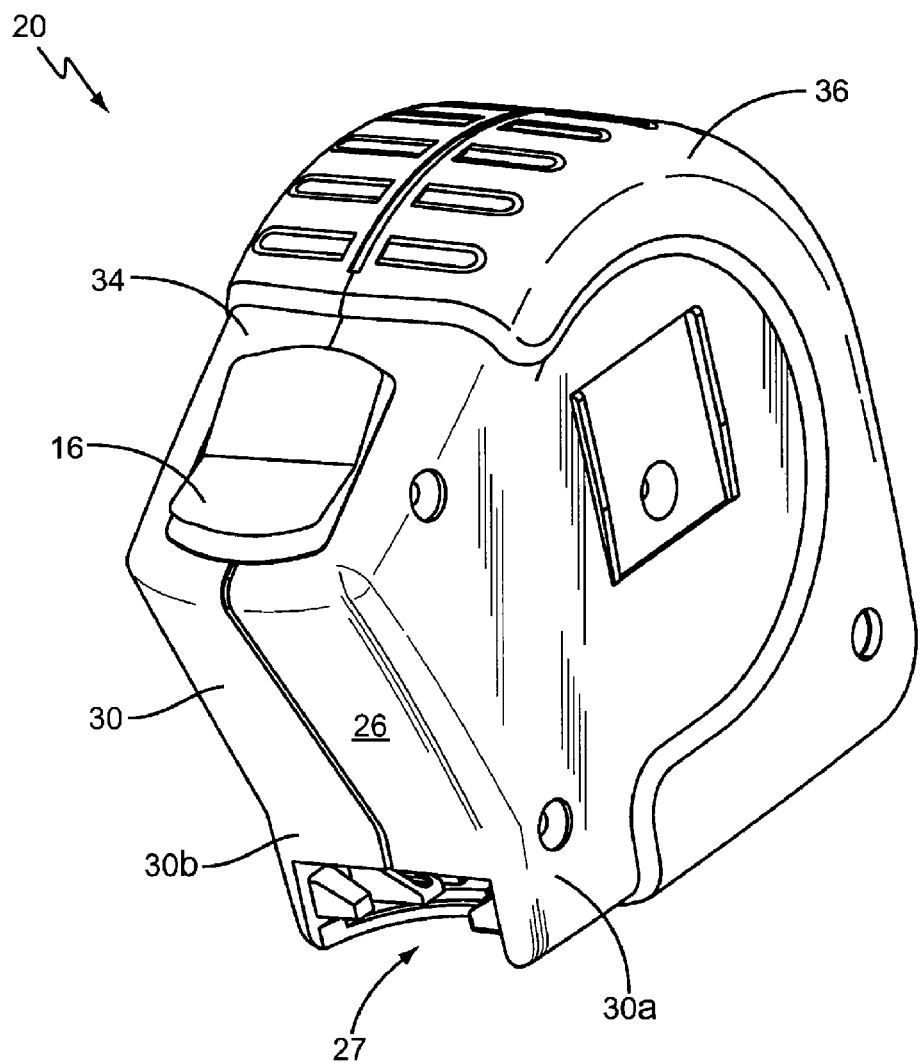
FIG. 2 is a perspective view of one embodiment of a tape measure housing in accordance with the present invention with some elements removed for clarity (e.g., screws, clip, etc.).
Figure 3:
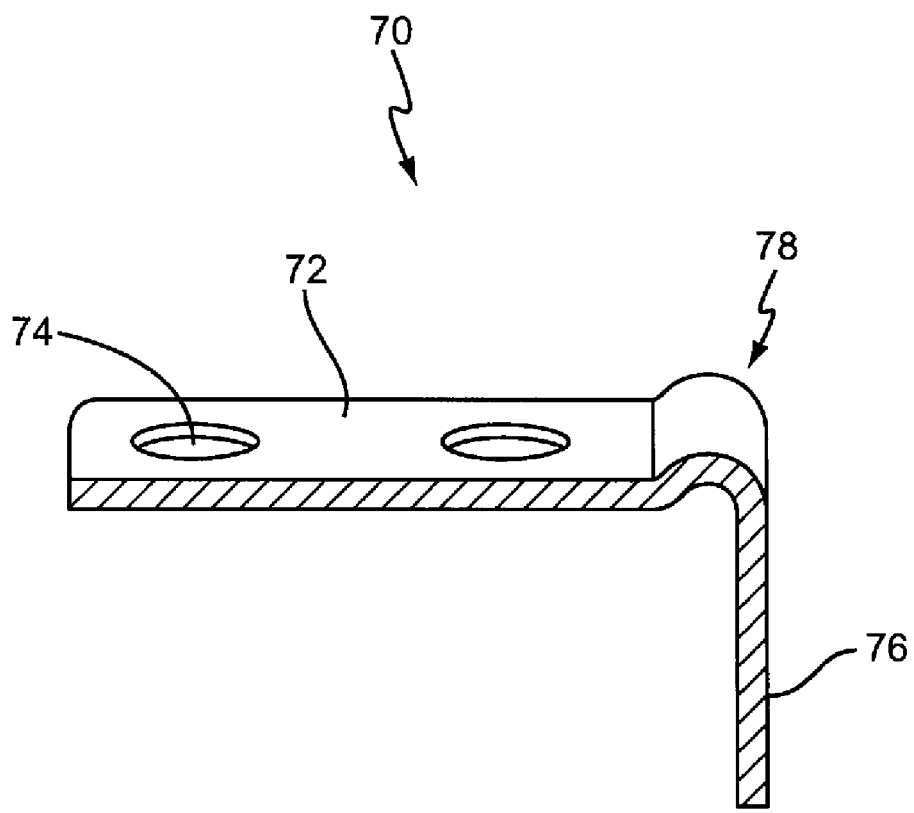
FIG. 3 is a cross-section of one embodiment of an end hook according to the present invention along the longitudinal axis of the blade.
Figure 4:
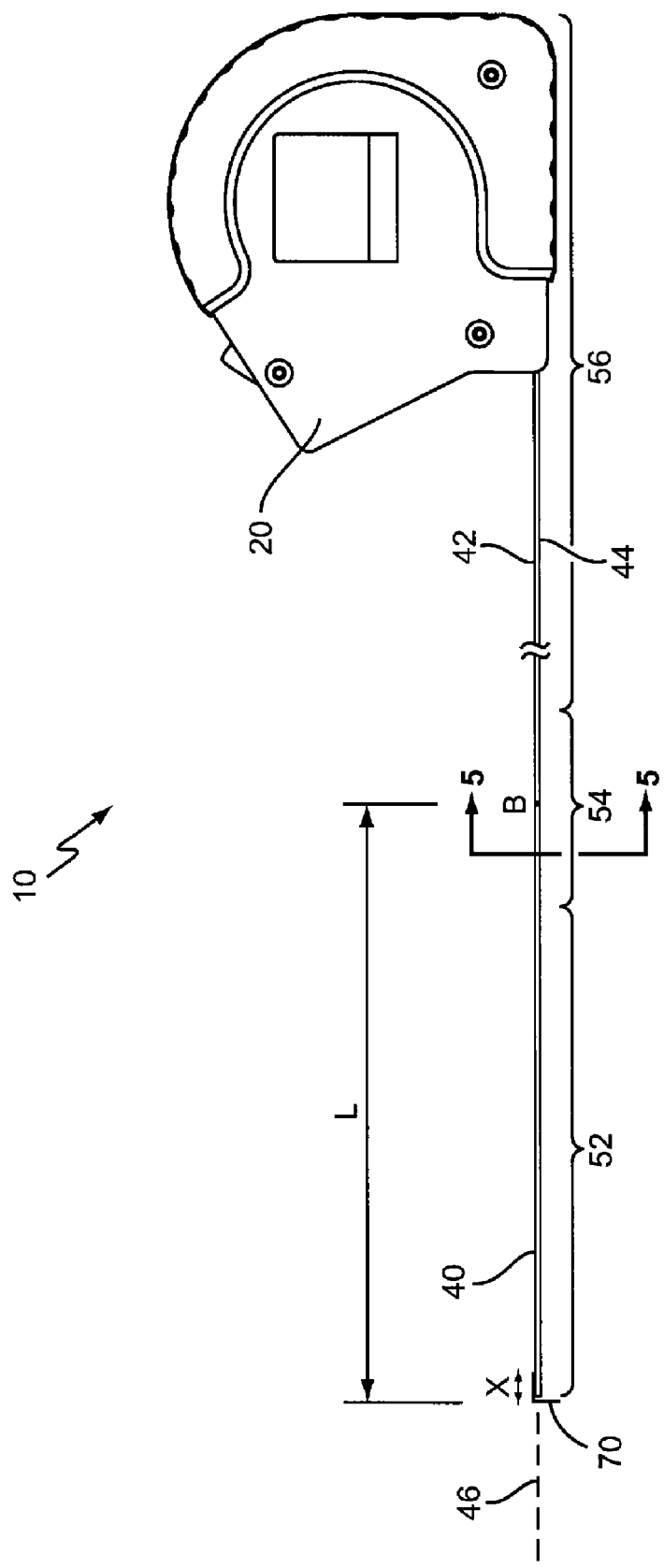
FIG. 4 is side view of a the tape measure of FIG. 1 with the blade extended.

The housing 20 typically includes a main case or shell 30 and a grip element 36 mounted on the shell 30. The housing 20 preferably has a generally squarish shape, with a rounded upper-rear corner and may have a slightly projecting nose, as shown in FIGS. 1-2. The housing 20 includes an opposing pair of sidewalls 32 and an interconnecting peripheral wall 34 that help define an internal chamber that houses the coiled portion of the tape 40, a suitable tape-biasing device, and portions of the locking mechanism. As shown in the Figures, the peripheral wall 34, and thus the shell 30, may be thought of as having a top 22, a bottom 24, a front 26, and a rear 28. The housing 20 includes an opening 27 typically located near its lower front corner that connects to the internal chamber. The distal end of the tape 40 extends through this opening 27. The housing 20 is preferably sized to fit within a user's hand, and also conveniently stored on a work belt or in a toolbox.

As shown in FIG. 2, the shell 30 may be constructed from two portions, a right-hand portion 30a and a left-hand portion 30b, joined together by suitable screws 38, as is known in the art. The external configurations of both the shell portions 30a,30b and the grip element portions 36 may advantageously be symmetrical if desired, but this is not required. Indeed, the two portions 30a,30b may have different internal and external configurations, depending on the internal workings of the tape measure 10, as is known in the art. However, as the present invention primarily relates to the tape blade 40 and the hook 70, the details of the external configuration of the shell 30 are not important to understanding the present invention. More information on possible external configurations of the housing 20 may be found in U.S. Patent Application Publication 2003/0233762, which is incorporated herein by reference. Attention is also directed to U.S. Pat. Nos. 4,527,334; 4,976,048; and 6,349,482; and 6,718,649; which are all incorporated herein by reference, for further discussion of the general design and operation of power return tape measures 10.

The tape blade 40 is designed to be selectively deployable from the housing 20, and locked against the retraction force by locking means 16. The tape blade 40 is typically made from steel and assumes a generally curved cross-sectional profile when deployed from the housing 20 and a generally flat cross-sectional profile when retracted into the housing 20. The blade typically has printing or other length indicia on an upper side 42, but is typically blank on a lower side 44. The tape blade 40 is also typically coated with a protective coating, such as that described in U.S. Patent Application Publication 2004/0071869," which is incorporated herein by reference. The tape blade 40 may be thought of as having a distal end portion 52, an expected buckling region 54, and an inner end portion 56 disposed along a longitudinal axis 46. When the blade 40 is deployed from the housing 20, the distal end portion 52 (with the hook 70 attached thereto) is deployed first, followed by the expected buckling region 54, and then the inner end portion 56. The blade 40 typically has a uniform cross-sectional thickness $T_U$ in at least the distal end portion 52 and the inner end portion 56, possibly throughout, but may have a non-uniform cross-sectional thickness in the expected buckling region 54. The expected buckling region 54 includes a location B that corresponds to the expected buckling point when the blade is subjected to a standout test, based on an assumption that the blade has a uniform cross-sectional thickness throughout. The location of point B may be derived theoretically or empirically. This expected buckling point B is spaced from the distal tip of the blade 40 by a distance L which is advantageously between eight and ten-and-one-half feet.

Figure 5A:
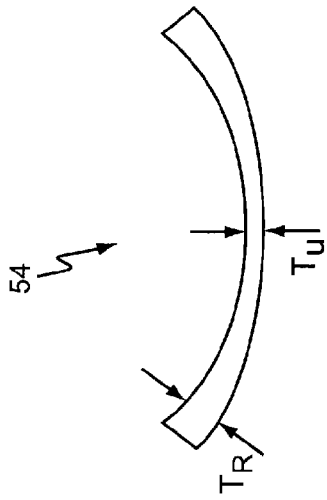
FIGS. 5A-F show cross-sectional views of various embodiments of the tape blade suitable for use in the present invention.
Figure 5B:
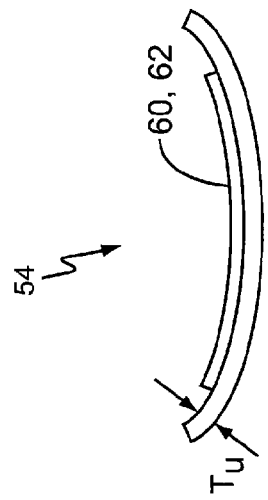
Figure 5C:
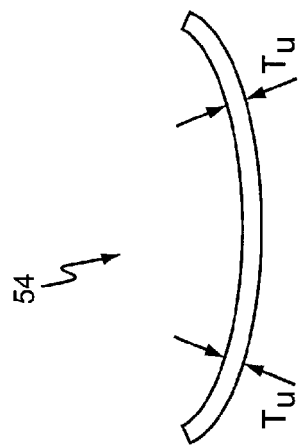
Figure 5D:
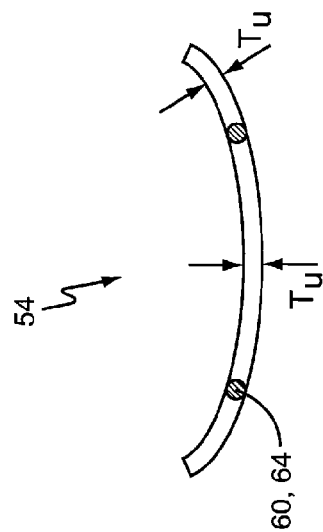
Figure 5E:
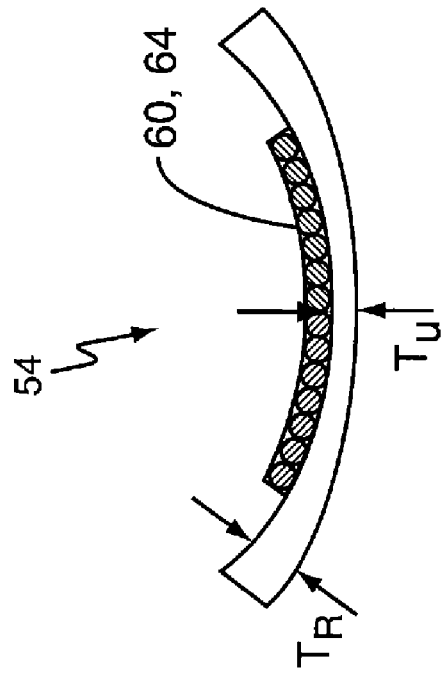
Figure 5F:
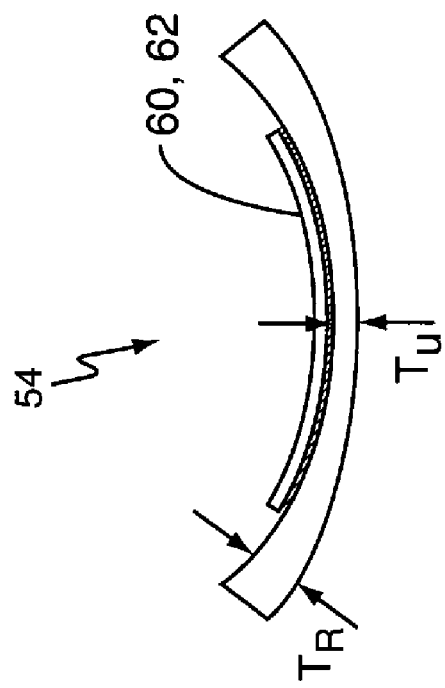

The tape blade 40 may have a uniform thickness $T_U$, both in cross-section and along its entire length, and a uniform material composition across its cross-section. See FIG. 5A. Alternatively, the tape blade 40 may have a thickness that varies across its cross-section (at least in the expected buckling region) and/or along its length and/or a varying material composition, or any combination thereof. For example, the thickness of the tape blade 40 may be thinner in the distal end portion of the blade 52, with a greater but uniform thickness $T_R$ in the longitudinal region where buckling is expected to occur. In other embodiments, the blade 40 may have integral longitudinal stiffening means 60 distributed across its cross-section. For example, the widthwise outer portions of the blade's cross-section may have a thickness of $T_R$, which is larger than the thickness $T_U$ of middle portion of the blade's lateral cross-section (see FIG. 5B, 5E, 5F). Alternatively, the widthwise outer portions of the blade's cross-section may have built-in longitudinal reinforcing members 60, such as longitudinally oriented carbon or aramid fibers 64 or the like (see FIG. 5C). Further still, the longitudinal reinforcing members 60 may take the form of carbon or aramid fiber mesh material embedded in the main material of the blade. It should be noted that the variations in the blade geometry and composition discussed above are intended to increase the buckling resistance of the blade so as to increase the blade's standout. Such reinforcement means should be present in at least the expected buckling region 54 of the blade 40, but may optionally extend from the expected buckling region 54 through the inner end portion 56 of the blade 40 (e.g., where the blade connects to the retraction spring). In still other embodiments, the blade 40 is provided with a thicker coating in the expected buckling region 54, and/or is provided with an reinforcing plate 62 attached to the blade 40 (e.g., riveted, bonded, or otherwise adhered) in the expected buckling region 54 (see FIG. 5D). While the reinforcing plate 62 is shown proximate upper side 42 in FIG. 5D, the reinforcing plate may alternatively be proximate the lower side 44, or there may be a reinforcing plate 62 on each side 42,44 of the blade 40 if desired. And, the various approaches discussed above may be used alone or in any combination in order to increase the standout of the blade 40.

The end hook 70 is attached to the distal end portion 52 of the blade 40. The end hook 70 typically serves the dual function of providing a means to hook or attach the tape blade 40 to a distant point and also preventing the blade 40 from being over-retracted into the housing. The hook 70 includes a first section 72 that is disposed generally parallel to the longitudinal axis 46 of the blade 40 and a second section 76 that is disposed generally perpendicular to the longitudinal axis 46 of the blade 40, with a suitable bend 78 therebetween. In the field, the first section 72 is sometimes referred to as the hook tongue, while the second section 76 is sometimes referred to as hook tip. The hook first section 72 may advantageously have a curved shape that corresponds to the concave curve of the blade's cross-section when deployed. The first section 72 may also advantageously include one or more (e.g., four) holes 74 employed to attach the hook 70 to the upper side 42 of blade 40 via suitable attachment means such as rivets or the like. These holes 74 may have a slightly larger size than the corresponding attachment means so as to allow the hook 70 to move relative to the blade 40 by an amount X that is advantageously the thickness of the hook second section 76 so as to allow for inside or outside measurements. Further, the holes 74 may be positioned to allow for proper retraction stop load distribution, see U.S. Pat. No. 5,659,970, which is incorporated herein by reference. The second section 76 of the hook may include a suitable center hole (not shown), typically an oval shaped hole, for accepting the exposed head of a nail to allow the tape measure 10 to be rotated about the nail. Further, the second section 76 may, if desired, include one or more magnets (not shown) to allow the hook 70 to be magnetically attached to a surface or measurement point.

In the prior art, hooks for tape measures have been made from steel due to the required strength and durability. For example, high quality tape measures are required to have hooks that can withstand repeated retractions of the blade, such as ≧2,000 retractions. While low carbon steel (i.e., type 1050) is suitable for such an application, steel is a relatively heavy material. The inventors of the present invention have discovered that the additional weight of steel end hooks at the end of the tape blade negatively impacts the standout of the blade 40. In particular, it has been discovered that the standout can be increased if the weight of the hook 70 is reduced. However, simply making the hook 70 dimensionally smaller negatively affects the strength, durability, and utility of the hook 70, particularly after repeated retractions of the blade 40. As such, preferred embodiments of the present invention utilize a hook 70 having a weight factor of not more than about 0.60, where the term "weight factor," as used herein, means the weight ratio of the hook 70 versus a dimensionally identical steel hook. For example, some embodiments of the present invention with approximately one inch wide blades 40 have a hook 70 that is made from titanium or a titanium alloy in order to maintain the required durability, with the titanium hook 70 having a weight of 2.27 grams-force versus a dimensionally identical steel hook with a weight of 4.08 grams-force, for a resulting weight factor of 0.556. Thus, the weight of the hook 70 at the end of the blade 40 is cut almost in half, while maintaining the desired dimensions and durability.

Figure 6:
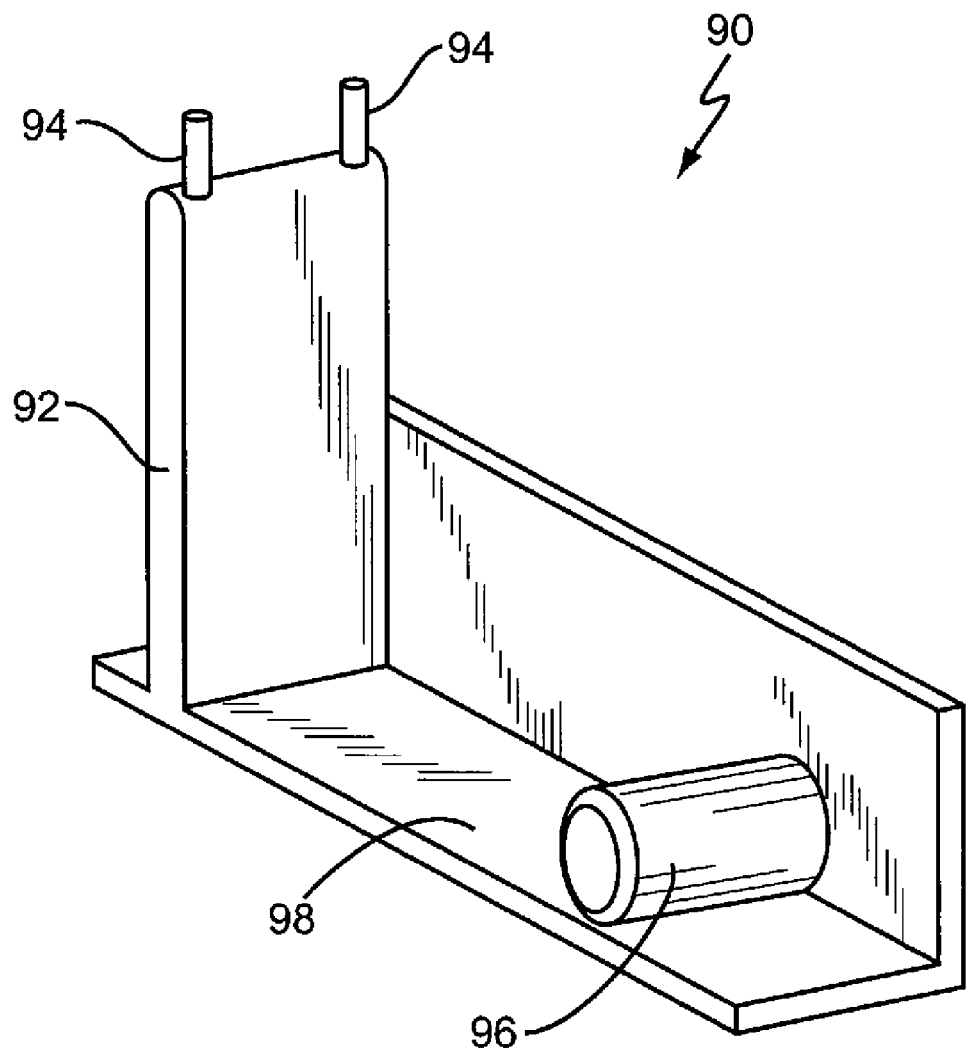
FIG. 6 shows a blade standout test fixture.

The tape measure 10 of the present invention has, due to its construction, improved standout. One approach to measuring standout is to extend the blade 40 from the housing 20 until the blade 40 collapses under its own weight (commonly referred to in the art as "buckling" or "breaking over"). The use of a standard fixture allows for comparison between different tape measure configurations. An example of one fixture 90 that may be used is shown in FIG. 6. The fixture 90 includes a support pylon 92 of height four inches with a ½ inch radiused upper edge. The support pylon 92 may include two roll pins 94 (e.g., ⅛ inch roll pins) or other means to prevent sideways slippage of the blade 40. A horizontal pin 96 of one inch diameter is placed six inches back from the center of the pylon 92 so as to leave a 7/32 of an inch gap between the horizontal pin 96 and a floor flange 98. The tape measure 10 is placed behind the horizontal pin 96, and the blade 40 is routed over the support pylon 92. The blade 40 is slowly extended until breakover occurs. The distance from the centerline of the support pylon 92 to hook 70 (more precisely, the distal face of the second section 76), with the hook 70 present, is the amount of standout. In most embodiments, the tape measure 10 according to the present invention has a standout of at least 9½ feet with an approximately one inch wide blade 40.

Tests were run to show that the use of a hook 70 with a weight factor of 0.60 or less resulted in improved standout. Two types of existing products with steel end hooks were measured using a version of the test procedure outlined above. In the test, the rivets holding the steel end hook 70 to the tape blade 40 were removed to release the steel hook. The steel hook and the rivets were then attached to the end of the blade 40 using clear plastic tape, and the standout was measured three times for each sample in this configuration using the fixture 90 described above. The steel hook was removed, and a titanium hook 70 of the same form factor was then attached to the end of the same blade 40 (along with the rivets) using the clear plastic tape. The standout was then measured three times for each sample using the fixture 90 described above. The weight of the steel hook was 0.0084 pounds, and the weight of the titanium hook 70 was 0.0046 pounds. Thus, the test compared the standout results using hooks of different weight factors, with all other variables being equal. The results are presented in the following Table 1.

TABLE 1

Standout Results (inches)

| | Lufkin ® 2125 Tape | | Lufkin ® PS3425 Tape | |
|---|---|---|---|---|
| Sample | Steel Hook | Titanium Hook | Sample | Steel Hook | Titanium Hook |
| 1A | 82.0 | 84.0 | 6A | 82.5 | 87.5 |
| 1B | 81.5 | 84.0 | 6B | 82.0 | 86.5 |
| 1C | 81.5 | 84.5 | 6C | 82.5 | 87.0 |
| 2A | 76.0 | 82.0 | 7A | 85.0 | 87.5 |
| 2B | 76.0 | 82.0 | 7B | 84.5 | 87.5 |
| 2C | 76.0 | 82.0 | 7C | 87.0 | 87.0 |
| 3A | 75.5 | 80.5 | 8A | 85.0 | 85.0 |
| 3B | 75.0 | 81.0 | 8B | 85.0 | 87.0 |
| 3C | 75.5 | 81.0 | 8C | 85.0 | 86.5 |
| 4A | 82.0 | 83.5 | 9A | 84.5 | 87.0 |
| 4B | 82.0 | 85.0 | 9B | 84.5 | 86.0 |
| 4C | 82.0 | 83.0 | 9C | 84.5 | 86.5 |
| 5A | 83.0 | 84.0 | 10A | 82.5 | 85.5 |
| 5B | 82.0 | 85.0 | 10B | 82.5 | 87.0 |
| 5C | 83.0 | 85.0 | 10C | 82.5 | 87.0 |
| Average | 79.5 | 83.1 | Average | 83.8 | 86.7 |

These test results show that use of the hook with a weight factor of less than 0.60 results in an increased standout. For the Lufkin® 2125 tape blade, the standout increase was approximately 3.6 inches on average. For the Lufkin® PS3425 tape blade, the standout increase was approximately 2.9 inches on average.

Another series of tests were run using a Max Steel® tape measure, available from The Stanley Works of New Britain, Conn. This tape measure used a blade with a width of one inch and an available measurement length of twenty-five feet. The tests were similar in procedure to those given above, with the weight of the steel hook was 0.0086 pounds, and the weight of the titanium hook 70 was 0.0051 pounds. Thus, the test compared the standout results using hooks of different weight factors, with all other variables being equal. The results are presented in the Table 2.

TABLE 2

Standout Results (inches)

| | Max Steel ® Tape | |
|---|---|---|
| Sample | Steel Hook | Titanium Hook |
| 1A | 90.0 | 102.0 |
| 1B | 90.5 | 104.0 |
| 1C | 90.5 | 104.5 |
| 2A | 99.0 | 103.0 |
| 2B | 99.0 | 103.0 |
| 2C | 99.0 | 104.0 |
| Average | 94.7 | 103.4 |

These test results show that use of the hook with a weight factor of less than 0.60 results in an increased standout. For the Max Steel® tape blade, the standout increase was approximately 8.7 inches on average.

While the test results given above are for tape measures with standout lengths less than 9½ feet, one of ordinary skill in the art should be able to further increase the standout provided by the use of the end hook with a weight factor of less than 0.60 using the teachings of U.S. Pat. No. 6,324,769 (incorporated herein by reference) to increase the standout to the desired length. Alternatively, one of ordinary skill in the art should be able to further increase the standout provided by the use of the end hook with a weight factor of less than 0.60 using the other teachings of the present disclosure (e.g., blade reinforcement means 60).

It should be understood that the tape measures 10 of the present invention may also include other features, such as shock-absorbing bumpers proximate the opening 27, specially coated blades, various locking mechanisms, hook reinforcing plates, and like, all of which are known in the art.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A tape measure, comprising:
    a main case having first and second sidewalls and a peripheral wall extending between said sidewalls;
    a flexible tape blade selectively deployable from said case; said tape blade having a generally curved cross-sectional profile when deployed from said main case and having a generally flat profile when retracted into said main case; said blade comprising a distal end portion, an inner end portion, and an expected buckling region therebetween; said distal end portion being deployed before said expected buckling region and said inner end portion when said blade is deployed from said case;
    a hook attached to said distal end portion of said tape blade so as to be movable a distance along a longitudinal axis of said tape blade; said hook comprising a first section disposed generally parallel to said longitudinal axis and a second section connected thereto and disposed generally normal to said longitudinal axis;
    a reinforcement distinct from but permanently attached to said blade in said expected buckling region, said distal end portion and said inner end portion being free of said reinforcement;
    said expected buckling region including a location where said blade would normally buckle in a standout test absent said reinforcement.

2. The tape measure of claim 1 wherein said reinforcement comprises a metallic plate.

3. The tape measure of claim 1 wherein said reinforcement comprises a longitudinally disposed fiber reinforcement.

4. The tape measure of claim 3 wherein said fiber reinforcement comprises a material selected from the group consisting of carbon and aramid.

5. The tape measure of claim 1 wherein said reinforcement is attached to said blade in said expected buckling region by adhesive.

6. The tape measure of claim 1 wherein said expected buckling region is located between about nine and ten-and-one-half feet from said hook.

7. The tape measure of claim 1 wherein said hook has a weight factor not more than about 0.60.

8. The tape measure of claim 1 wherein said reinforcement is attached to said blade on an upper side thereof.

9. The tape measure of claim 8:
    wherein said expected buckling region is located between about nine and ten-and-one-half feet from said hook;
    wherein said hook has a weight factor not more than about 0.60; and
    wherein said reinforcement comprises a metallic plate.

10. The tape measure of claim 1:
    wherein said expected buckling region is located between about nine and ten feet from said hook;
    wherein said reinforcement comprises a longitudinally disposed fiber reinforcement, said fiber reinforcement comprising a material selected from the group consisting of carbon and aramid; and
    wherein said hook has a weight factor not more than about 0.60.

* * * * *